June 30, 1953 — H. D. ROOP — 2,644,097
ARTICLE GRADING APPARATUS
Filed Feb. 19, 1951 — 3 Sheets-Sheet 1

INVENTOR.
HAROLD D. ROOP
BY HIS ATTORNEYS.
HARRIS, KIECH, FOSTER & HARRIS

Patented June 30, 1953

2,644,097

UNITED STATES PATENT OFFICE 2,644,097

ARTICLE GRADING APPARATUS

Harold D. Roop, Los Angeles, Calif., assignor to Automatic X-Ray Corporation, Los Angeles, Calif., a corporation of California Application February 19, 1951, Serial No. 211,618

18 Claims. (Cl. 250—83.6)

The invention to be disclosed herein relates in general to an apparatus for grading articles and a primary object of the invention is to provide an electronic circuit which may be employed to measure such diverse characteristics of articles as the sizes or colors thereof, the X-ray opacities thereof, the intensities of radiation emitted thereby, and so forth. More particularly, a primary object of the invention is to provide an electronic circuit which may be employed to measure a single characteristic of articles, or which may be employed to compensate for the effects of variations in one characteristic of the articles on the measurements of another characteristic thereof so that the true values of such other characteristic are obtained. In this latter connection, the invention may, for example, be employed to compensate for the effects of variations in the sizes of the articles on measurements of the colors thereof, or to compensate for the effects of variations in the sizes of the articles on measurements of the conditions of the internal structures thereof, as represented by the amounts of X-radiation, or radiation from radioisotopes, transmitted by the articles.

The invention may be employed to measure a wide variety of characteristics of articles of various types. For example, the invention may be employed to measure various characteristics of, or to compensate for the effects of variations in various characteristics of, such articles as manufactured products of various kinds, fruits, radioactive materials, and the like. Examples of these and other applications of the invention will be considered hereinafter and it will be understood that the invention is not to be regarded as limited to the particular applications thereof disclosed.

In general, an important object of the invention is to provide an apparatus which includes an A. C. bridge circuit for balancing against each other two out-of-phase A. C. potentials so as to produce an A. C. output signal the amplitude of which is equal to the difference between the amplitudes of two A. C. potentials applied to the bridge circuit, and which includes variable-gain amplifier means in the bridge circuit and controlled by a source of variable D. C. for varying the amplitude of one of the A. C. potentials as a function of variations in the variable D. C. so as to vary the amplitude of the A. C. output signal as a function of such variations in the variable D. C. More particularly, an object is to provide such an apparatus which includes generating means for producing in the bridge circuit two in-phase A. C. potentials, and which includes variable-gain amplifying and phase-inverting means in the bridge circuit for inverting the phase of one of the in-phase A. C. potentials so as to render the in-phase A. C. potentials out of phase by 180°, and for varying the amplitude of the phase-inverted A. C. potential, the amplifying and phase-inverting means being connected to the source of variable D. C. so that the gain thereof is varied as a function of variations in the variable D. C. so as to vary the amplitude of the A. C. output signal as a function of such variations in the variable D. C.

An important advantage of the present invention is that the electronic circuit outlined in the preceding paragraph is capable of converting minute D. C. variations, particularly those arising from such high impedance sources as photocells, ionization chambers, and the like, into large variations in the A. C. output signal of the bridge circuit. Thus, small direct currents may be amplified without resorting to direct-coupled current amplifiers, or without resorting to "chopping" devices in connection with an A. C. amplifier, which is an important feature of the invention.

Another important object of the invention is to provide an apparatus wherein the source of variable D. C. for controlling the gain of the phase-inverting means in the electronic circuit outlined above comprises a device responsive to variations in some characteristic of an article which is to be measured. For example, the source of variable D. C. may be a photocell responsive to the size of the article, or it may be an ionization chamber responsive to the radiation emitted by a radioactive material. In either case, the amplitude of the A. C. output signal produced by the bridge circuit is a function of the magnitude of the characteristic being measured.

Still another important object of the invention is to provide an apparatus wherein the amplitudes of the in-phase A. C. potentials produced in the bridge circuit are respectively functions of the magnitudes of some common characteristic of a standard article and a test article so that the A. C. output signal is a function of any difference between such characteristic of the test article and that of the standard article, and wherein the source of variable D. C. is responsive to another characteristic of the test article so as to compensate for the effects of variations in such other characteristic on the A. C. output signal. Considering a couple of examples in this connection, the apparatus of the invention may be employed to compensate for the effects of differences in size among a group of test articles on the X-ray or radioisotope opacities thereof when the apparatus is employed to measure the X-ray or radioisotope opacities of the articles relative to that of the standard article, or to compensate for the effects of differences in size among a group of test articles on measurements of the colors of the test articles when the apparatus is being employed to measure the color of the test articles relative to that of the standard article. In connection with the latter example, the apparatus may be employed to grade citrus fruits, or other agricultural products, according to color, or to grade any other articles according to color.

Still another important object is to provide an apparatus wherein the output of the A. C. bridge circuit may be connected to any desired means responsive to the A. C. output signal. For example, the A. C. output signal may be applied to an indicating means, a recording means, a sorting means for sorting the articles being tested into different grades according to the values of some common characteristic thereof, and the like. Preferably, the A. C. output signal is amplified before application to the signal responsive means, and this may be accomplished by a conventional A. C. amplifier, which is an important advantage of the invention.

Another important feature of the invention is that it provides an apparatus capable of X-ray or radioisotope inspection at an effective level of intensity which may be several times the capacity of the radiation source. This important feature provides several practical advantages. For example, it permits X-ray inspection of articles of varying thickness to obtain the effect of substantially constant X-radiation transmission by the article of variable thickness without varying the output of the X-ray generator. Also, it permits the use of an X-ray generator of smaller capacity. Further, it permits the use of a standard X-ray opacity which is constant, the effects of the varying thickness of the test article on the X-ray opacity thereof being compensated for by employing for the source of variable D. C. a device which is responsive to the variations in the thickness of the test article. Thus, it is not necessary to move the standard article with which the test article is compared through the X-ray beams in synchronism with the test article as heretofore required.

The foregoing objects, advantages and features of the present invention, together with various objects, advantages and features thereof which will become apparent, may be attained with the exemplary embodiments of the invention which are illustrated in the accompanying drawings and which are described in detail hereinafter. Referring to the drawings:

Figure 1:
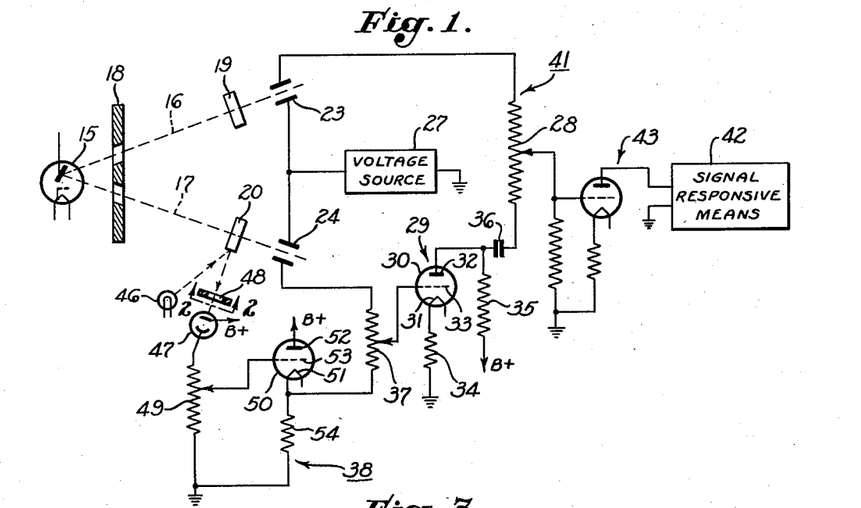
Fig. 1 is a diagrammatic view of one embodiment of the invention.
Figure 2:
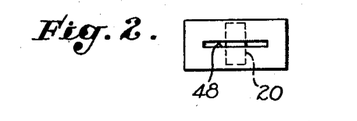
Fig. 2 is a view taken as indicated by the arrowed line 2—2 of Fig. 1.

Referring particularly to Fig. 1 of the drawings, the numeral 15 designates an X-ray tube which produces pulsating radiation as a result of being energized by an alternating or pulsating potential derived from any suitable source, not shown. The X-radiation produced by the tube 15 is divided into two X-ray beams 16 and 17 by a collimating means 18, the X-ray beam 16 being directed toward a standard article 19 and the X-ray beam 17 being directed toward a test article 20. The standard article 19 may merely represent an equivalent X-ray opacity equal to that regarded as normal or standard for the test article undergoing inspection.

The radiation transmitted by the standard article 19 enters a device 23 which is disposed in the X-ray beam 16 and which is responsive to X-radiation, and the X-radiation transmitted by the test article 20 enters a device 24 which is disposed in the X-ray beam 17 and which is also responsive to X-radiation. Various types of X-ray sensitive devices may be employed, such as ionization chambers, light-sensitive cells in combination with fluorescent screens, or the like. However, I prefer to employ ionization chambers as the X-ray sensitive devices 23 and 24, such ionization chambers being illustrated diagrammatically as simple condensers for convenience.

A single source of high potential, D. C. voltage is indicated at 27, one side of this voltage source being grounded and the other side thereof being connected to one electrode of each of the ionization chambers 23 and 24 so as to apply equal potentials thereto. The other electrode of the ionization chamber 23 is connected to one end of a potentiometer 28 and the other electrode of the other ionization chamber 24 is connected to the other end of the potentiometer 28 through a variable-gain amplifying and phase-inverting means 29, the latter comprising an electronic tube 30 having a cathode 31, an anode or plate 32 and a grid 33. The cathode 31 is biased by a resistor 34, one end of which is grounded as shown. The plate 32 has a suitable plate potential applied thereto through a resistor 35 which is shown diagrammatically as connected to a source of steady positive potential. The output of the tube 30 is applied to the output potentiometer 28 through a condenser 36. The grid 33 of the tube 30 is connected to a potentiometer 37 one end of which is connected to the ionization chamber 24 and the other end of which is connected to a compensating means 38 which, as will be described in detail hereinafter, compensates for any variations in the thicknesses of test articles 20 disposed in the test X-ray beam 17. The resistor of the potentiometer 37 is part of the grid leak of the tube 30.

As will be apparent, the ionization chambers 23 and 24, the voltage source 27, the potentiometer 28 and the phase-inverting means 29 form an A. C. bridge circuit 41 the output of which appears at the adjustable tap of the potentiometer 28. Because of the pulsating nature of the transmitted X-ray beams 16 and 17 entering the respective ionization chambers 23 and 24, two A. C. potentials are produced in the bridge circuit 41, these A. C. potentials initially being in phase. However, the phase-inverting means 29 inverts the phase of one of the A. C. potentials relative to the other so that the two potentials are applied to the ends of the potentiometer 28 180° out of phase. Thus, an A. C. output signal having an amplitude equal to the difference between the amplitudes of the two A. C. potentials derived from the ionization chambers 23 and 24 appears at the adjustable tap of the potentiometer 28. This A. C. output signal may be applied to any signal responsive means 42 through a conventional A. C. amplifier 43, only one stage of which is shown. For example, the signal responsive means 42 may be an indicating means, a recording means, or it may be a sorting means, such as that shown in my application Serial 705,695, filed October 25, 1946, for sorting a group of the test articles 20 into different grades according to the X-ray opacities thereof.

Thus, the A. C. bridge circuit 41 measures the X-ray opacity of the test article, i. e., measures the intensity of the X-radiation transmitted thereby, and compares it to that of the standard article 19, the difference between the X-ray opacity of the test article and that of the standard article determining the amplitude of the A. C. output signal appearing at the adjustable tap of the potentiometer 28. Considered alone, the A. C. bridge circuit 41 forms no part of the present invention, being claimed in my Patent No. 2,513,818, issued July 4, 1950, and reference is hereby made to this patent for a detailed description of the operation of the A. C. bridge circuit 41.

In the embodiment under consideration, the invention resides in adding to the A. C. bridge circuit 41 the compensating means 38, the latter serving to control the gain of the tube 30 so as to control the amplitude of the phase-inverted A. C. potential appearing at the output of this tube. Thus, the compensating means 38 serves to control the amplitude of the A. C. output signal appearing at the adjustable tap of the potentiometer 28, as will be described in detail hereinafter.

As hereinbefore suggested, the compensating means 38 in the embodiment under consideration compensates for size variations, such as differences in size among a group of test articles undergoing inspection. As will be apparent, if the X-ray opacity of the standard article 19 is selected for a test article 20 of a given standard size, a larger or smaller, i. e., thicker or thinner, test article would, in the absence of the compensating means 38, produce false X-ray opacity indications even though the X-ray opacity per unit length of such thicker or thinner test article is the same as that of a normal test article of standard thickness. Thus, in the absence of the compensating means 38, a test article thicker than standard might have an X-ray opacity equal to or exceeding the standard X-ray opacity, but might have a serious flaw in its internal structure which would render it defective. On the other hand, a test article smaller than standard and without internal flaws might have an X-ray opacity less than standard. Thus, in the absence of the compensating means 38, the thicker, defective article would be accepted and the thinner, acceptable article would be rejected. The compensating means 38 compensates for such size variations by correspondingly varying the gain of the tube 30 so that the amplitude of the A. C. output signal appearing at the adjustable tap of the potentiometer 28 is, in effect, indicative of the X-ray opacity per unit of thickness, rather than overall X-ray opacity, which is an important feature of the invention. Thus, if a specimen either thicker or thinner than the standard article 19, but otherwise normal, is undergoing inspection, the compensator 38 varies the gain of the tube 30 in such a way that the amplitude of the signal at the lower end of the potentiometer 28 is equal to that of the signal applied to the upper end thereof by the standard chamber 23. In this way, the bridge is held in balance for a normal specimen of any thickness within the range of the system.

Considering the compensating means 38 in more detail, the test article 20 is shown as illuminated by a steady light source 46, which may be an electric light bulb connected to a D.-C. source. A photocell 47 is positioned to receive reflected light from the test article 20, the photocell being so positioned that the amount of reflected light it receives is proportional to the thickness of the test article in the direction of the test X-ray beam 17. If desired, a slit 48 may be disposed between the test article 20 and the photocell 47 so that the photocell receives reflected light from some selected area of the test article, this being particularly advantageous where the test article is not of uniform thickness. For example, assuming that the test article 20 is spherical, the slit 48 is preferably so positioned that the photocell 47 receives reflected light from an area of the test article opposite the maximum diameter thereof. Such an arrangement would, for example, be employed in connection with such substantially spherical objects as oranges.

As indicated in Fig. 1 of the drawings, the anode of the photocell 47 is connected to a source of steady positive potential. The cathode of the photocell is connected to ground through the resistor of a potentiometer 49, which resistor constitutes the grid leak of a cathode follower tube 50 having a cathode 51, a plate 52 and a grid 53. The grid 53 of the cathode follower tube 50 is connected to the adjustable tap of the potentiometer 49 and the plate of this tube is connected to a source of steady positive potential, as indicated in Fig. 1 of the drawings. The cathode 51 is connected to a load resistor 54, and the grid leak resistor for the phase-inverting tube 30, i. e., the resistor of the potentiometer 37, is connected to ground through the load resistor 54.

Considering the operation of the embodiment illustrated in Fig. 1 of the drawings, with the compensating means 38 disconnected from the balance of the circuit, the A. C. bridge circuit 41 is balanced with a normal test article 20 of some predetermined standard thickness in the test X-ray beam 17 and with the standard article 19 in the standard X-ray beam 16, the normal test article of standard thickness employed being known to have the desired internal structure. The A. C. bridge circuit 41 may be balanced to provide an A. C. output signal at the adjustable tap of the potentiometer 28 which is equal to zero, or the bridge circuit may be adjusted to provide an A. C. output signal other than zero with a normal test article 20 of standard thickness in the test X-ray beam 17. The latter is particularly desirable where the signal responsive means 42 may include a thyratron network as disclosed in my aforementioned application.

After the bridge circuit 41 has been balanced, or has been adjusted to provide a desired degree of unbalance, the compensating means 38 is reconnected in the circuit and, with conditions otherwise the same, the circuit is re-balanced by adjusting the manual gain control of the phase-inverting tube 30, i. e., by adjusting the potentiometer 37. Now, if a thicker test article is substituted for the test article 20 of normal or standard thickness employed during the balancing operations, the gain of the phase-inverting tube 30 will increase because the photocell 47 will receive a larger amount of reflected light from the test article of larger thickness. Similarly, the gain of the tube 30 will decrease for a test article of a thickness less than the standard thickness since the photocell will receive less reflected light. In other words, test articles of thicknesses greater or less than standard will decrease or increase the negative bias on the grid 33 of the phase-inverting tube 30 by virtue of an increased or decreased flow of positive current through the load resistor 54. This action tends to maintain balance, or the predetermined unbalance, in the bridge circuit 41 for test articles of different sizes so long as the conditions of the internal structures thereof are normal or standard. However, if a particular test article has a defect tending to vary its X-ray opacity per unit of thickness from standard, the bridge circuit 41 will become unbalanced, or its degree of unbalance will vary, to indicate such defect. The resulting change in the A. C. output signal may be employed in the signal responsive means 42 to reject such article, or to indicate on a record that such article possesses the defect. Thus, the embodiment described automatically compensates for variations in the sizes of the test articles, which is an important feature of the invention.

It will be noted that an article smaller than standard will transmit a greater percentage of the test X-ray beam 17 incident thereon, but will reflect less light to the photocell 47, thus reducing the gain of the tube 30. An article larger than standard produces the opposite effect. This constitutes a very important feature since, in effect, it permits the inspection of all sizes of test articles with the same transmitted radiation level, thus maintaining a uniform sensitivity of inspection. Normally, without the compensating means 38, the use of an X-ray tube 15 with a fixed output would result in high radiation transmission through a small test article and, as a result, a defect of given proportions would produce a violent reaction at the output of the bridge circuit. On the other hand, an article larger than standard would transmit a relatively small amount of radiation and a defect of the same proportions would therefore produce a small reaction. Actually, articles of different sizes do transmit various intensities as described above, but the signals arising from these intensities are acted upon by the tube 30 through the control of the photocell 47 in such a way as to offset their variations from the selected level of transmitted radiation. Thus, this action of the compensating means 38 in connection with the tube 30 produces the same effect as would be produced if the radiation output of the X-ray tube 15 were varied with variations in test article sizes. Thus, the compensating means 38 as used here not only performs its primary function, i. e., size compensation, but serves as well to maintain a uniform level of sensitivity in the apparatus despite variations in the sizes of the test articles, which is an important feature.

Figure 3:
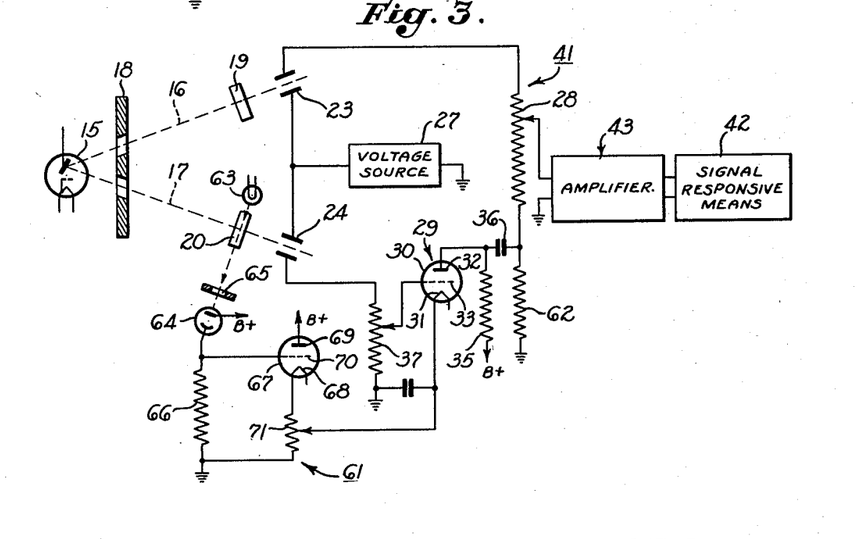
Fig. 3 is a diagrammatic view of an embodiment of the invention which is similar to that illustrated in Fig. 1.

Referring now to Fig. 3 of the drawings, the embodiment illustrated therein is similar to that illustrated in Fig. 1, the principal difference being that the embodiment of Fig. 3 includes a size compensating means 61 which, although corresponding to the size compensating means 38, operates on transmitted light instead of reflected light. Consequently, except for the elements of the compensating means 61, the reference numerals employed previously have been applied to the corresponding elements of the embodiment of Fig. 3. It will be noted that the bridge circuit 41 of the embodiment of Fig. 3 differs from the bridge circuit 41 of the embodiment of Fig. 1 only in the connections to the elements of the phase-inverting tube 30 and in the connection of a grounded resistor 62 to one end of the potentiometer 28.

Considering the compensating means 61 in more detail, a steady light source 63, such as an electric light bulb connected to a suitable D. C. source, not shown, and a photocell 64 are disposed on opposite sides of the test article 20 in the test beam 17, a slit 65 preferably being disposed between the test article 20 and the photocell 64. As will be apparent, with this arrangement, the amount of light reaching the photocell 64 decreases as the thickness of the test article 20 increases, whereas, in the embodiment of Fig. 1 of the drawings, the amount of light received by the photocell 47 increased as the thickness of the test article increased. Thus, somewhat different connections between the photocell 64 and the phase-inverting tube 30 are required, as will be described in detail in the following paragraph.

The anode of the photocell 64 is connected to a source of steady positive potential, as indicated in Fig. 3 of the drawings, and the cathode thereof is grounded through a resistor 66. The compensating means 61 includes a cathode follower tube 67 having a cathode 68, a plate 69 and a grid 70, the grid being connected across the resistor 66 so that when the photocell 64 is illuminated, a steady positive voltage proportional to the intensity of the illumination is applied to the grid 70 of the cathode follower tube 67 across the resistor 66. The plate 69 of the tube 67 is connected to a source of steady positive potential, the plate current varying with the intensity of the illumination falling on the photocell 64. For example, an increase in the intensity of the illumination falling on the photocell increases the positive voltage applied to the grid 70 and thus increases the plate current, such an increase in the plate current resulting in an increase in the positive voltage across a resistor 71 which connects the cathode 68 to ground. The resistor 71 forms part of a potentiometer which is connected to the cathode 31 of the phase-inverting tube 30 so that an increase in the positive voltage across the resistor 71 resulting from an increase in the intensity of illumination of the photocell 64 increases the effective negative bias on the grid of the tube 30.

Considering the operation of the embodiment of Fig. 3 of the drawings, the largest of the test articles whose X-ray opacities are to be indicated, recorded, or otherwise handled by the signal responsive means 42 is placed in the test X-ray beam 17. Thus, the largest test article creates a maximum silhouette at the slit 65 so that a minimum of light reaches the photocell 64. With the X-ray tube 15 operating at normal output, the gain of the tube 30 is adjusted by means of the potentiometer 37 until the bridge circuit 41 is in balance, or until it is unbalanced to the desired extent. The largest test article is then replaced by the smallest test article, both of these articles having normal internal structures so that the X-ray opacities thereof per unit length are equal. With the smallest specimen in the test X-ray beam 17 and in the light beam from the source 63, a minimum silhouette is produced at the slit 65 and a maximum amount of light reaches the photocell 64. The potentiometer 71 is then adjusted to restore the bridge circuit 41 to balance, or to the desired degree of unbalance. This process is repeated until the bridge circuit 41 remains in balance, or unbalanced to the desired extent, with either the largest or the smallest test article in the test X-ray beam 17. Once made, these adjustments remain substantially constant.

In order to avoid the variables which would be involved in using actual test articles in making the foregoing adjustments, artificial specimens are preferably used. Such artificial specimens may consist of hollow rubber or plastic articles respectively having the same external dimensions as the largest and smallest test articles. These hollow artificial articles may be filled with water or other liquid to extents sufficient to provide normal or standard X-ray opacities. If desired, other specimens may be substituted for the largest and smallest test articles in making the adjustments of the bridge circuit 41.

After the bridge circuit 41 has been adjusted, the apparatus is placed in operation, it being assumed that a conveyor, not shown, or the like, is employed to advance a test article 20 into the test X-ray beam 16. When the test article 20 reaches a predetermined position in the X-ray beam, a predetermined amount of the light normally received by the photocell 64 is cut off. If, for example, the test article is substantially spherical, it is preferably moved into a position in the test X-ray beam 17 such that the area of maximum diameter thereof is in alignment with the slit 65. As the test article is moved into its predetermined position in the test X-ray beam 17 and in the beam of light to the photocell 64, the amount of light reaching the photocell 64 decreases. This reduces the positive voltages across the resistors 66 and 71. This has the effect of reducing the negative grid bias of the phase-inverting tube 30 and thus increasing the gain thereof. At the instant the test article 20 reaches the predetermined position in the test X-ray beam 17 and in the light beam, the gain in the tube 30 has been increased just enough to keep the system in balance, or unbalanced to the desired extent, if the article has a normal X-ray opacity, any deviation on the X-ray opacity from normal resulting in a corresponding deviation in the magnitude of the A. C. output signal appearing at the adjustable tap of the potentiometer 28 of the bridge circuit 41. It will be understood that the gain of the phase-inverting tube 30 varies as a function of the amount of light reaching the photocell 64 and thus varies in accordance with differences in the sizes of the test articles being inspected. Such gain variations affect the amplitude of the phase-inverted A. C. potential in the bridge circuit 41 correspondingly, and thus vary the amplitude of the A. C. output signal correspondingly. Consequently, any size variations in the articles being tested are automatically compensated so that the amplitude of the A. C. output signal is indicative only of the conditions of the internal structures of the test articles.

If the X-ray inspection bridge circuit 41 were used without the compensating means 61, the X-ray opacity of the standard article 19 would correspond to that of a normal test article of a given size, and the bridge circuit 41 would be in balance, or unbalanced to a predetermined extent, whenever a normal test article of that size is disposed in the inspection area. However, when articles of different sizes are inspected with the compensating means 61 in the circuit, the bridge circuit 41 is rarely in balance across the two ionization chambers 23 and 24. With the compensating means 61 in the circuit, the standard article 19 merely determines the level of sensitivity of the bridge circuit 41 and the standard ionization chamber 23 merely acts as the source of a signal having a fixed amplitude and a wave shape identical with that supplied to the grid of the phase-inverting tube 30, the same being true of the embodiment of Fig. 1. Also, as in the embodiment of Fig. 1, the compensating means 61 of the embodiment of Fig. 3 does not actually control the intensity of the X-ray beams, but the end result is the same as if it did.

Figures 4, 5:
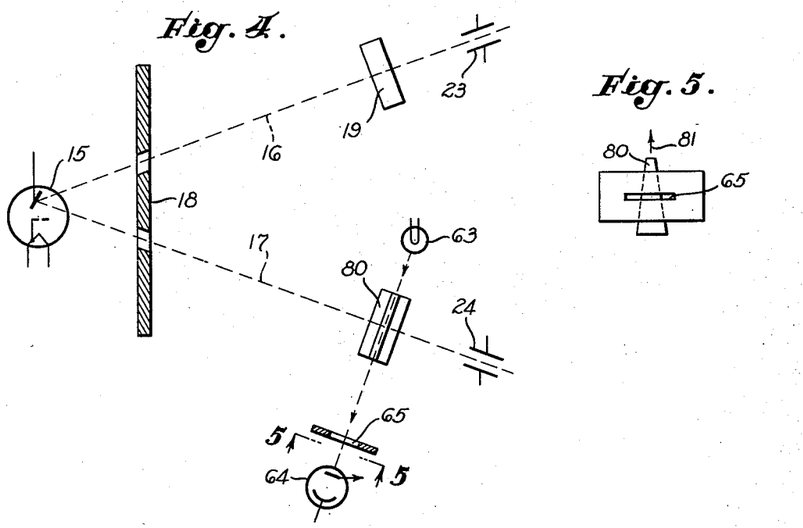
Fig. 4 is a fragmentary diagrammatic view of a modification of the embodiment illustrated in Fig. 3.
Fig. 5 is a view taken as indicated by the arrowed line 5—5 of Fig. 4.

Referring now to Figs. 4 and 5 of the drawings, the embodiment of Fig. 3 is fragmentarily shown in connection with a test article 80 of irregular shape, the article 80 being generally wedge shaped in the illustration. It will be assumed that the embodiment of Fig. 3 is to employed to continuously scan successive portions of the wedge-shaped article 80 as the latter is moved through the test X-ray beam 17, and the light beam to the photocell 64, in the direction of the arrow 81 in Fig. 5. Thus, as the test article 80 is moved through the test X-ray and light beams in this manner, less and less X-radiation reaches the test ionization chamber 24 and less and less light reaches the photocell 64, the position of the standard article 19 and its X-ray opacity remaining constant.

It is thought that the operation of the embodiment of Fig. 3 of the drawings with the wedge-shaped test article 80 illustrated in Figs. 4 and 5 may best be considered by way of an example citing numerical values. It will be understood, of course, that these numerical values are merely illustrative and not intended as limiting. Let us assume that the thickness of the wedge 80 is one inch at its smaller end and four inches at its larger end. Also, let us assume that, at a given output of the X-ray tube 15, the intensity of transmitted radiation through the one inch section of the wedge 80 is fourteen times as great as the intensity of transmitted radiation through the four inch section thereof. Let it further be assumed that when the X-ray generator is operating at maximum capacity, the intensity transmitted through the four inch section of the wedge is less than half of that required for adequate inspection.

Under the conditions outlined in the preceding paragraph, the action of the compensating means 61 of the embodiment of Fig. 3 is to permit inspecting the four inch section of the wedge 80 at an effective level of intensity several times as great as the generator is capable of supplying. In order to attain this result, a standard article 19 having an X-ray opacity equal, for example, to that of the two inch section of the wedge 80, is placed in the standard X-ray beam 16, the system then being balanced, or unbalanced to the desired extent with the two inch section of a normal wedge 80 in the test X-ray beam 17. It will be assumed that the two inch standard article 19 transmits radiation with an intensity seven times as great as the four inch section of the wedge 80 and one half as great as the one inch section thereof.

Now, the next step is to move the wedge 80 through the test X-ray beam 17 and the light beam to the photocell 64 point first. As the result of the hereinbefore described action of the compensating means 61, the gain of the phase-inverting tube 30 is continuously regulated so that its output is always equal to the signal from the standard ionization chamber 23, or always differs from the signal from the standard ionization chamber by a predetermined amount to provide a predetermined unbalance in the bridge circuit, assuming, of course, that the internal structure of the wedge is normal. Thus, the one inch section of the wedge 80 is inspected with an effective transmitted intensity which is fifty percent of normal. In other words, the output of the phase-inverting tube 30 corresponds to the radiation transmitted by a two inch section, even though a one inch section of the wedge is being scanned. Now, as the wedge continues to advance, the two inch section is inspected at an intensity of one hundred percent of normal, the gain of the phase-inverting tube 30 having been increased by the photocell 64 to accomplish this. As the wedge advances further, the gain of the phase-inverting tube 30 continues to increase and, as the four inch section of the wedge 80 reaches the predetermined position in the test X-ray beam 17 and in the beam of light to the photocell 64, the effective intensity is seven times as great as the maximum capacity of the generator. That is to say, the output of the phase-inverting tube 30 corresponds to a level of transmitted radiation through the four-inch section of the wedge which is equal to seven times the maximum capacity of the X-ray tube 15 because of the action of the photocell 64 in increasing the gain of the phase-inverting tube as the thickness of the wedge 80 increases. Thus, the action of the compensating means 61 again is to maintain constant the effective level of the radiation transmitted by the standard article 19, and thus the effect of a radiation intensity level several times the output of the tube 15 is obtained, which is an important feature of the invention.

The foregoing effect results in several practical advantages. For example, it permits inspection by scanning a moving article with effectively a constant level of transmitted radiation so that the level of sensitivity of the bridge circuit 41 remains constant. Also, the level of sensitivity then becomes a matter of choice and, within the limits of the circuit, may be anything whatsoever. If desired, different levels of sensitivity may even be employed for inspecting different parts of the wedge 80. Furthermore, no control of the output of the X-ray tube 15 to compensate for variations in the thickness of the wedge 80 is required, nor is any moving standard article required.

There are many structures of varying thickness, such as the wedge 80, where a defect of a given size in one section may be cause for rejection, whereas the same size of defect in another section may be unimportant. An example of this is found in explosive projectiles where a small void in the explosive charge near the base of the projectile is not acceptable, whereas a larger void near the nose of the projectile is of no importance. In such a case, the sensitivity of inspection must be automatically adjusted as different points along the projectile are inspected and such automatic adjustments may readily be applied to the size compensating means 61.

Figure 6:
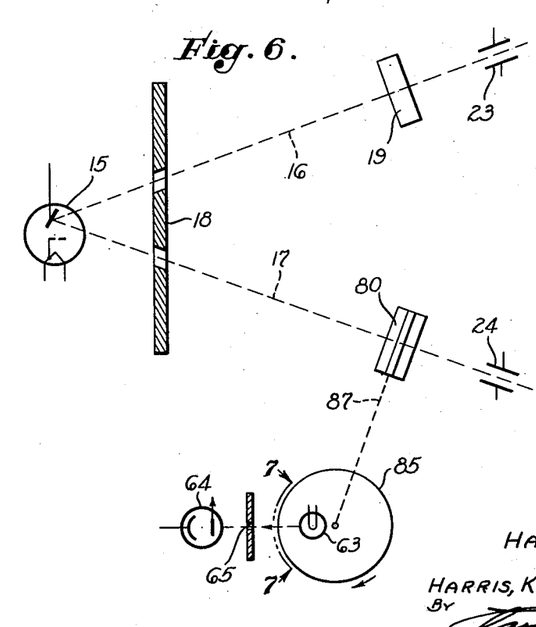
Fig. 6 is a fragmentary diagrammatic view illustrating another modification of the embodiment of Fig. 3.
Figure 7:
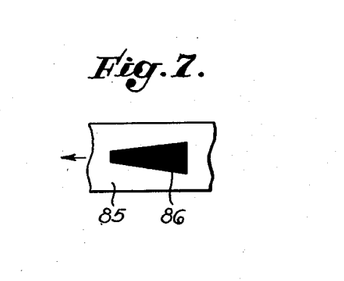
Fig. 7 is a view taken as indicated by the arrowed line 7—7 of Fig. 6.

Referring to Figs. 6 and 7 of the drawings, there are many instances where inspection of a large number of articles of varying thicknesses throughout their lengths is necessary, and where the external dimensions of all of the test articles are identical, explosive projectiles being one example. While such test articles may be scanned directly in the manner shown in Figs. 4 and 5 of the drawings, it is more convenient to scan at a point removed from the X-ray inspection area to avoid concentrating a lot of apparatus at such area. As shown in Fig. 6, the photocell 64, the slit 65 and the light source 63 are located remotely from the wedge-shaped test article 80. Passing between the light source 63 and the photocell 64 is a screen 85 which is transparent except for an opaque silhouette 86 of the wedge-shaped article. For purposes of illustration, the screen 85 is shown as cylindrical and rotatable around the light source 63. The cylindrical screen 85 is driven in synchronism with the movement of the wedge-shaped article 80 through the test X-ray beam 17, any suitable synchronizing connection, represented by the dotted line 87, being employed to move the wedge-shaped test article 80 and to rotate the cylindrical screen 85 in synchronism. Thus, with this arrangement, whenever a particular section of the wedge-shaped article 80 is disposed in the test X-ray beam 17, the corresponding section of the silhouette 86 on the screen 85 is disposed in the light beam to the photocell 64. Thus, the results previously described in connection with Figs. 4 and 5 of the drawings are obtained without the necessity of scanning the wedge-shaped test article 80 directly, thereby avoiding concentration of apparatus in the X-ray inspection area, which is an important feature.

Figure 8:
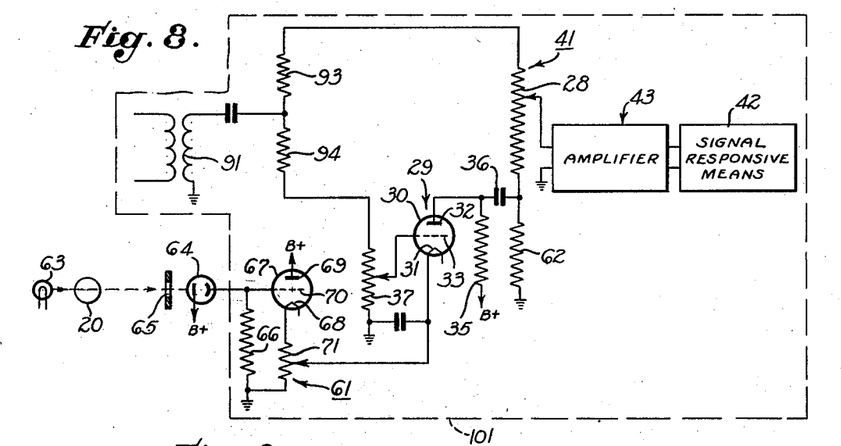
Fig. 8 is a diagrammatic view of still another embodiment of the invention.

Referring now to Fig. 8 of the drawings, illustrated therein is an embodiment of the invention which is identical to that illustrated in Fig. 3 of the drawings, except that, instead of producing two in-phase A. C. potentials in the bridge circuit 41 by means of the actions of the pulsating beams of X-radiation on the ionization chambers 23 and 24, the two in-phase A. C. potentials are produced in the bridge circuit 41 by connecting the bridge circuit to an A. C. source, illustrated as the secondary of a transformer 91, although any desired A. C. source may be employed. Resistors 93 and 94 have been substituted for the ionization chambers 23 and 24 for protective purposes. It will be noted that, in this embodiment, the two in-phase A. C. potentials produced in the bridge circuit 41 are of constant amplitude, as compared to the variable-amplitude A. C. potential resulting from the test ionization chamber 24 in the embodiment of Fig. 3 of the drawings. Thus, the only variations introduced into the bridge circuit 41 of Fig. 8 arise from the photocell 64, which may be made responsive to article size. Thus, in effect, the embodiment of Fig. 8 is a sizing circuit.

Considering the operation of the embodiment of Fig. 8, either the largest or the smallest article of a group of articles to be graded for size may be placed in the beam from the light source 63. The bridge 41 is then balanced, or provided with a desired degree of unbalance, by adjusting the potentiometers 37 and 71. If an article of another size is then placed in the light beam, the gain of the tube 67 is changed and the bridge circuit 41 is unbalanced, or the degree of unbalance thereof is changed, as a function of the change in size. The sensitivity of this embodiment may be governed by the strength of the signal picked up at the transformer 91, the intensity of the light source 63, the gain of the tube 30, or any combination thereof. If desired, the input signal provided by the transformer 91 may be very large as compared to that provided by the X-ray system of Fig. 3 so that a tube 30 with a relatively low gain may be employed.

The sizing circuit of Fig. 8 may be employed in conjunction with the size compensating circuit of Fig. 3. With such an arrangement, the size compensating circuit measures the size-compensated X-ray opacities of the test articles, while the sizing circuit measures the sizes of the articles. The signal responsive means of the two circuits may be employed to sort the articles into different grades according to size and according to X-ray opacity with such a combination of the sizing and size-compensating circuits.

An important feature of each of the embodiments thus far described, and of those hereinafter described, is that a minute direct current applied to vary the bias of the phase-inverting tube 30 appears at the output of the A. C. bridge circuit 41 as a large A. C. output signal, depending upon the gain of the phase-inverting tube. Thus, the embodiments described previously, in addition to performing the functions heretofore discussed, also serve as amplifiers for direct currents, the resulting A. C. signal at the output of the bridge circuit 41 being amplifiable in a conventional A. C. voltage amplifier. Thus, there is no necessity for resorting to direct-coupled current amplifiers, or for resorting to chopping devices in connection with conventional A. C. voltage amplifiers, which is an important feature. This advantage of the embodiments hereinbefore described is particularly important in connection with high impedance D. C. sources, such as photocells, ionization chambers and the like, having small direct current outputs since such small direct current outputs are converted into large A. C. output signals at the output of the bridge circuit 41.

It will be understood that while the invention has been considered in connection with X-ray inspection of test articles in connection with the embodiments of Figs. 1 to 7, the invention may be employed for other inspections. For example, by employing color-responsive photocells in place of the ionization chambers 23 and 24, and by illuminating the standard and test articles with pulsating light, measurements of color, instead of X-ray opacity, may be obtained, the size compensating action being the same so that the resulting output signals are purely functions of color and are independent of size. For example, in grading lemons according to color, a large, light green, or partially ripe, lemon may reflect as much yellow light as a small, ripe lemon. Thus, without the size compensating action of the present invention, the two lemons would be graded alike. However, the size compensating means 38 in the embodiment of Fig. 1, for example, may be employed in connection with the other elements illustrated in Fig. 1 to compensate for the differences in size between such a small, ripe lemon and such a large, light green, or partially ripe, lemon. Thus, the resulting A. C. output signal appearing at the output of the bridge circuit 41 is a function only of color, and is independent of size.

Considering another example of other possible applications of the invention, the embodiment of Fig. 8 of the drawings might be employed to grade radioactive materials according to the intensity of ionizing radiation, for example, emitted thereby by substituting an ionization chamber for the photocell 64 in Fig. 8. In such an embodiment, the magnitude of the A. C. output signal appearing at the output of the bridge circuit 41 would be a function of the intensity of ionizing radiation emitted by the radioactive material being tested.

Figure 9:
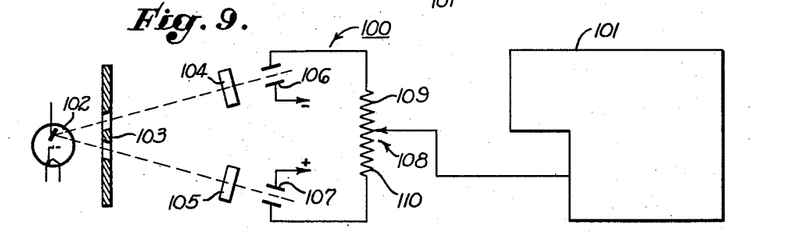
Fig. 9 is a diagrammatic view of a further embodiment of the invention.

Another important application of this invention is in the field of inspection or gauging with radioisotopes, the invention providing an improved apparatus for using radioisotopes for this purpose. Referring to Fig. 9 of the drawings, the broken-line box 101 contains the elements within the same box in Fig. 8. The numeral 102 designates a radioisotope whose radiation is collimated, by a collimator 103, into two beams respectively directed through standard and test articles 104 and 105 toward ionization chambers 106 and 107. The latter are saturated by voltages of opposite sign as shown and are connected in a bridge circuit 100 which includes a potentiometer 108 comprising resistors 109 and 110. The adjustable tap of the potentiometer is connected in the grid circuit of the tube 67 in the broken-line box 101.

Considering the operation of the embodiment of Fig. 9, since the ionization chambers 106 and 107 are saturated by voltages of opposite sign, their outputs are in opposition across the resistors 109 and 110, such outputs being steady since the radiation from the source 102 is normally steady. As long as the bridge 100 is in balance, no signal will appear at the grid of the cathode follower tube 67 in the box 101, and the bridge 41 in such box will remain in balance, or unbalanced to the desired extent. However, if the opacity of the test article 105 is changed, the balance of the bridge 100 is affected and the bridge 41 in the box 101 reacts in the manner hereinbefore described. As will be apparent, the bridge 100 may be balanced initially, or initially unbalanced to a desired extent, by means of the adjustable tap of the potentiometer 108.

The advantage of this way of using an isotope can be appreciated only if conventional methods are considered. An inspection of the circuit in Fig. 9 will show that while very small direct currents flow in 109 and 110, the capacities associated with this part of the circuit need be no greater than the inherent capacities in the ionization chambers and their cables. Therefore, the time lag occurring between a change in the thickness of either 104 or 105 and the appearance of the resulting signal at the grid of 67 can be made very short—in the neighborhood of 0.001 second, for example. The reaction of 67 to an incoming signal, together with the consequent reaction of the phase inverter tube 29, is almost instantaneous, and from that point on only the alternating currents arising in the source 91 are to be considered. This enables isotopes to be used in relatively high speed gauging and inspection operations. As used at present, only direct current amplifiers are employed, and the reaction time of these devices is so great that inspection procedures must be carried on at a very slow rate of speed. The system shown in Fig. 9 will have an inspection speed very little slower than that available in the X-ray generator-operated bridge illustrated in Fig. 1.

Figure 10:
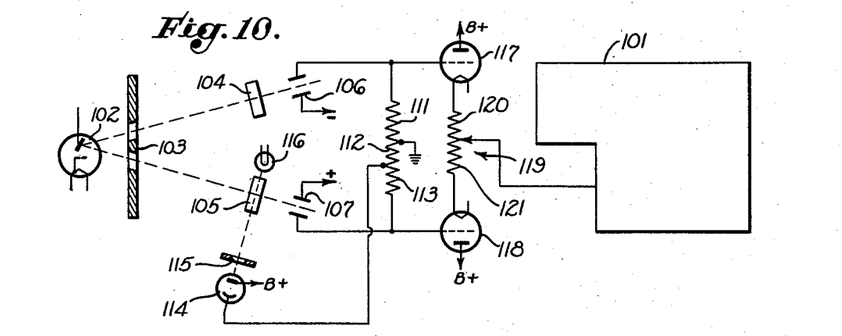
Fig. 10 is a diagrammatic view of yet another embodiment of the invention.

The radioisotope system of Fig. 9 may readily be made size compensating, as shown in Fig. 10. The ionization chambers 106 and 107 are connected to the grids of cathode followers 117 and 118, respectively, the grid circuits of the tubes 117 and 118 including resistors 111, 112 and 113 connected in the bridge circuit as shown. The cathodes of the tubes 117 and 118 are connected to the ends of a potentiometer 119 comprising resistors 120 and 121, the adjustable tap of the potentiometer being connected in the grid circuit of the tube 67 in the box 101. The grid bias of the tube 118 is controlled by a size compensator including a photocell 114 which receives a silhouette of the test article 105 through a slit 115, the test article being illuminated by a lamp 116. Either the anode or the cathode of the photocell 114 may be connected to the grid circuit of 118. If the anode of the photocell is connected to such grid circuit, the cathode thereof must be connected to B—.

The operation of the embodiment of Fig. 10 will be apparent in view of previous descriptions of the operation of the other embodiments. It should be noted that the addition of the size compensator and the two cathode followers to the circuit does not insert any appreciably greater delay factors than are present in the simple bridge 100 included in Fig. 9. Note also that a phototube, or any equivalent device, may be used to control the cathode follower 118 by varying its grid bias in either one of the two ways mentioned above. In either case an element of the photocell or equivalent is connected into the grid resistor of the cathode follower 118 as indicated. If the cathode of the photocell is so connected, then an increase in the light intercepted by the cell will cause an increased flow of positive voltage in the grid resistor and thus reduce the negative bias of the cathode follower 118. If the anode of the photocell is hooked to the grid resistor and the cell then saturated by negative voltage applied to the cathode, an opposite effect is secured. Where grid resistors of considerable value are permissible, as is the case here, no impedance matching cathode follower, such as 67, is required for the phototube. The principal function of the tube 67 is to act as an impedance matching device. A high impedance is always required for the output of the photocell. This requirement is satisfied by the grid leak of 67. On the other hand, a very low impedance is necessary for cathode bias control, such as is illustrated in Fig. 1 in connection with phase inverter tube 29. The tube 67 also satisfies this requirement across its own cathode resistor. It will be apparent that there are several variations of the manner in which the various components in Figs. 9 and 10 may be connected to each other without affecting the fundamental operation of the system. For example, it is possible to connect the cathode outputs of the two cathode followers in Fig. 10 directly to the cathode of the phase inverter tube 29, thus eliminating 67 entirely.

Various other applications of the invention will be apparent to those skilled in the art, and, therefore, it will be understood that I do not intend to be limited to the particular applications of the invention hereinbefore described, nor to the particular exemplary embodiments of the invention hereinbefore described. Accordingly, I hereby reserve the right to all such applications and to all such changes, substitutions and modifications of the embodiments disclosed which properly come within the scope of the invention.

I claim as my invention:

1. In an apparatus of the character described, the combination of: a source of variable D. C.; means including an A. C. bridge circuit for balancing against each other two A. C. potentials of the same frequency which are out of phase by 180° so as to produce an A. C. output signal the amplitude of which is equal to the difference between the amplitudes of said A. C. potentials; means for producing in said bridge circuit two A. C. potentials of the same frequency which are out of phase by 180°; variable-gain amplifier means in said bridge circuit for varying the amplitude of one of said A. C. potentials; and means connecting said source of variable D. C. to said amplifier means for varying the gain of said amplifier means as a function of variations of said variable D. C. so as to vary the amplitude of said A. C. output signal as a function of such variations in said variable D. C.

2. In an apparatus of the character described, the combination of: a source of variable D. C.; means including an A. C. bridge circuit for balancing against each other two A. C. potentials of the same frequency which are out of phase by 180° so as to produce an A. C. output signal the amplitude of which is equal to the difference between the amplitudes of said A. C. potentials; generating means for producing in said bridge circuit two A. C. potentials of the same frequency which are in phase; phase-inverting means in said bridge circuit for inverting the phase of one of said in-phase A. C. potentials so as to render said in-phase A. C. potentials out of phase by 180°, said phase-inverting means including variable-gain amplifier means for varying the amplitude of said phase-inverted A. C. potential; and means connecting said source of variable D. C. to said phase-inverting means for varying the gain of said amplifier means as a function of variations in said variable D. C. so as to vary the amplitude of said A. C. output signal as a function of such variations in said variable D. C.

3. An apparatus as defined in claim 2 including an A. C. voltage amplifier connected to the output of said bridge circuit for amplifying said A. C. output signal.

4. In an apparatus of the character described, the combination of: a source of variable D. C.; means including an A. C. bridge circuit for balancing against each other two A. C. potentials of the same frequency which are out of phase by 180° so as to produce an A. C. output signal the amplitude of which is equal to the difference between the amplitudes of said A. C. potentials; generating means for producing in said bridge circuit two A. C. potentials of the same frequency which are in phase; means including a variable-gain electronic tube in said bridge circuit for inverting the phase of one of said in-phase A. C. potentials so as to render said in-phase A. C. potentials 180° out of phase, and for varying the amplitude of said phase-inverted A. C. potential; and means connecting said source of variable D. C. to said electronic tube for varying the gain of said electronic tube as a function of variations in said variable D. C. so as to vary the amplitude of said A. C. output signal as a function of such variations in said variable D. C.

5. An apparatus as defined in claim 4 including an A. C. voltage amplifier connected to the output of said bridge circuit for amplifying said A. C. output signal.

6. In a system for determining the relative intensities of two pulsating beams of X-rays respectively transmitted by two articles, an apparatus as defined in claim 4 wherein said generating means includes: means including an X-ray generator for producing two pulsating X-ray beams directed toward the articles, respectively; and two X-ray sensitive devices respectively disposed in the beams of X-rays transmitted by the articles and disposed in opposite sides of said bridge circuit to produce in said bridge circuit two in-phase A. C. potentials of the same frequency respectively varying with variations in the intensities of said transmitted X-ray beams.

7. In an apparatus for measuring the relative intensities of two pulsating beams of X-rays respectively transmitted by two articles and for compensating for the effects of variations in the thickness of one of the articles on the intensity of the pulsating beams of X-rays transmitted thereby, a system as defined in claim 6 wherein said source of variable D. C. comprises means responsive to variations in the thickness of said one article for varying said D. C. as a function of variations in the thickness thereof.

8. An apparatus as defined in claim 7 wherein said X-ray sensitive devices are ionization chambers and wherein said means responsive to variations in the thickness of said one article includes a photocell.

9. In a system for determining the relative intensities of two pulsating beams of radiation, an apparatus as defined in claim 4 wherein said generating means includes two devices sensitive to such radiation, said devices respectively being disposed in opposite sides of said bridge circuit and respectively being disposed in said beams so as to render said in-phase A. C. potentials variable with variations in the intensities of the respective beams.

10. In a system for measuring a dimension of an article, an apparatus as defined in claim 4 wherein said source of variable D. C. comprises a photocell responsive to said dimension.

11. In a system for measuring a characteristic of an article, an apparatus as defined in claim 4 wherein said source of variable D. C. comprises a device responsive to said characteristic for varying said D. C. as a function of variations in said characteristic.

12. In an apparatus of the character described, the combination of: a source of variable D. C.; means including an A. C. bridge circuit for balancing against each other two A. C. potentials of the same frequency which are out of phase by 180° so as to produce an A. C. output signal the amplitude of which is equal to the difference between the amplitudes of said A. C. potentials; an A. C. source connected to said bridge circuit so as to produce in opposite sides thereof two A. C. potentials of the same frequency which are in phase; means including a variable-gain electronic tube in said bridge circuit for inverting the phase of one of said in-phase A. C. potentials so as to render said in-phase A. C. potentials 180° out of phase, and for varying the amplitude of said phase-inverted A. C. potential; and means connecting said source of variable D. C. to said electronic tube for varying the gain of said electronic tube as a function of variations in said variable D. C. so as to vary the amplitude of said A. C. output signal as a function of such variations in said variable D. C.

13. In a system for measuring a characteristic of an article, an apparatus as defined in claim 12 wherein said source of variable D. C. comprises a device responsive to variations in said characteristic for varying said D. C. as a function of such variations in said characteristic.

14. An apparatus as defined in claim 4 wherein said electronic tube includes a grid, a plate and a cathode, said source of variable D. C. being connected to said grid.

15. An apparatus as defined in claim 4 wherein said electronic tube includes a grid, a plate and a cathode, said source of variable D. C. being connected to said cathode.

16. In an apparatus for measuring a characteristic of articles which is subject to real variations and which is further subject to false variations resulting from variations in a dimension of the articles, the combination of: circuit means responsive to real and false variations in said characteristic for producing an electrical signal which is variable with said real and false variations, said circuit means including variable-gain amplifier means for varying said signal; and means responsive to variations in said dimension and connected in circuit with said amplifier means for varying the gain of said amplifier means as a function of variations in said dimension so as to compensate for the effects of said false variations on said signal.

17. In an apparatus for measuring a characteristic of articles which is subject to real variations and which is further subject to false variations resulting from variations in a dimension of the articles, the combination of: electronic circuit means, including an element responsive to real and false variations in said characteristic, for producing an electrical signal which is variable with said real and false variations, said electronic circuit means including variable-gain amplifier means for varying said signal; and means including a photocell responsive to variations in said dimension and connected in circuit with said amplifier means for varying the gain of said amplifier means as a function of variations in said dimension so as to compensate for the effects of said false variations on said signal.

18. An apparatus as defined in claim 2 wherein said source of variable D. C. includes a D. C. bridge circuit.

HAROLD D. ROOP.

References Cited in the file of this patent

UNITED STATES PATENTS

| Number | Name | Date |
|---|---|---|
| 2,468,350 | Sunstein | Apr. 26, 1949 |
| 2,499,222 | Hofstadter | Feb. 28, 1950 |
| 2,507,304 | Hofstadter | May 9, 1950 |
| 2,512,355 | Marshall et al. | June 20, 1950 |
| 2,539,203 | Pohl | Jan. 23, 1951 |
| 2,546,271 | McKenney et al. | Mar. 27, 1951 |
| 2,557,581 | Triman | June 19, 1951 |
| 2,561,182 | Crane | July 17, 1951 |